United States Patent [19]
McChristian, Jr.

[11] Patent Number: 4,715,555
[45] Date of Patent: Dec. 29, 1987

[54] DUAL MODE FISHING REEL ASSEMBLY

[76] Inventor: Robert L. McChristian, Jr., 10896 SW. 188 St., Miami, Fla. 33157

[21] Appl. No.: 933,981

[22] Filed: Nov. 24, 1986

[51] Int. Cl.⁴ ............................................. A01K 89/02
[52] U.S. Cl. .................. 242/84.5 R; 242/218
[58] Field of Search .................. 242/84.5 R, 84.51 R, 242/212, 213, 214, 217, 218, 219, 220; 192/45.2, 46, 47

[56] References Cited

U.S. PATENT DOCUMENTS

| | | | |
|---|---|---|---|
| 929,867 | 8/1909 | Meisselbach et al. | 242/220 |
| 1,663,800 | 3/1928 | Kautzky | 242/220 |
| 1,995,221 | 3/1935 | Peel et al. | 242/84.5 R |
| 2,620,052 | 12/1952 | Andersson | 242/220 |
| 2,984,433 | 5/1961 | Clark | 242/214 |
| 3,490,714 | 1/1970 | Underwood et al. | 242/84.51 R |
| 4,461,435 | 7/1984 | Kovalovsky | 242/84.51 R |

Primary Examiner—Billy S. Taylor
Attorney, Agent, or Firm—John Cyril Malloy

[57] ABSTRACT

A dual mode fishing reel construction which could be of the fly reel type wherein the subject reel structure automatically changes from a direct drive of the line containing spool, during take-up of the fishing line, to an anti-reversing mode, during playout of the fishing line, wherein the crankarm used to rotate the spool for take-up of the fishing line will be prevented from free rotation during playout of the fishing line. A direct drive mechanism serves to drivingly interconnect a manually rotated crankshaft with the spool for forward rotation (line take-up) and will automatically disengage from such direct driving interconnection with the spool when the spool is forced into reverse rotation such as in casting or playout of the line by a fish, without the need for manually adjustable or engageable actuating mechanisms.

5 Claims, 11 Drawing Figures

DUAL MODE FISHING REEL ASSEMBLY

BACKGROUND OF THE INVENTION

1. Field of the Invention

This invention relates to a fishing reel assembly, preferably but not necessarily of the type used as fly reels and including both a direct drive mechanism and an anti-reversing structure each capable of being automatically operable without the need for manual actuation by the user of the reel and specifically wherein a crankarm allowing for manual forward rotation of the spool is automatically disengageable therefrom and maintainable in any position to prevent free reverse rotation thereof which would possibly cause inadvertent injury to the user of the reel assembly.

2. Description of the Prior Art

Fishing reel assemblies existing in the prior art and commercially available vary widely in structural design and performance characteristics. However, certain problems are well recognized particularly among those who use certain types of fishing reels designed for a specific type of fishing. Such reels include but are not limited to "fly reels" which are specifically designed for the fly casting technique of fishing. Such fly reels are typically characterized by small, lightweight construction. However, the structural design and integrity of such fly reels must be such as to guarantee reliance in operation particularly under what may be considered harsh operating conditions.

One problem associated with fishing reels is a certain safety feature involving the reverse, free rotation of the crankarm or crank handle of the fishing reel when the spool of the reel is forced to rotate in a reverse direction such as during line playout. This is common for instance when a fish takes the lure or bait and runs with such bait a significant distance at rapid speeds. Such reverse rotation of the reel, in many prior art devices will in turn cause rapid rotation of the crank arm which in turn could cause damage to the fingers of a fisherman if the fisherman's hands are not kept out of the rotary path of the freely rotating crankarm. Accordingly, an automatic anti-reversing feature associated with fishing reel assemblies, including fly reels woud be particularly desirable in order to avoid any inadvertent injury. Again, in a preferred structure, such anti-reversing capabilities should be activated automaticaly upon reverse rotation of the spool carrying the fishing line, such as when the line is being played out during casting or in the above-noted instant when the fish runs with the lure.

Associated with such a preferred anti-reversing capability in a fishing reel would be a direct drive capability which is automatically activated by the forward rotation of the crankarm causing the fishing line to be taken up or reeled back onto the spool. However, and again in a preferred fishing reel assembly, automatic disengagement of such a direct drive mechanism would be highly advantageous particularly when associated with an automatic activation of the aforementioned and described anti-reversing mechanism.

Another feature considered a necessity among sportsman would of course be the ability of the preferred reel assembly to operate in the above fashion and overcome the above set forth and well recognized problems without the structural components or mechanism associated with a preferred reel assembly from becoming jammed during operation over extended periods of use. The U.S. Pat. No. 4,461,435 is representative of certain prior art fishing reel assemblies, specifically of the fly reel type which, while operable for the intended function and method of performance, still may be considered to include certain disadvantages or lack certain advantageous performance characteristics when used as intended.

It is obvious therefore that there is a recognized need for a fishing reel assembly capable of having "dual mode" operational characteristics including a direct drive mechanism which automatically disengages upon activation of an anti-reversing structure both associated with a preferred fishing reel assembly or structure.

SUMMARY OF THE INVENTION

The present invention relates to a reel assembly particularly but not necessarily of the type characterized as a fly reel and being specifically structured to operate in what may be referred to as a dual mode. The reel assembly of the present invention comprises a spool structured to have an extremely long length of fishing line continuously mounted thereon. The spool is rotatably mounted within a casing and more specifically, is rotatably supported on a centrally located crankshaft passing through a centrally disposed bore of the spool. The crankshaft is rotatably mounted on the reel for support and is manually operated by a crankarm secured to the distal end of the crankshaft.

An important feature of the present invention is the incorporation therein of a direct drive mechanism which serves to interconnect the crankshaft with the spool for what may be referred to as forward rotation of the spool. Such forward rotation is considered rotation in a direction which will accomplish "reeling in" or takeup of the fishing line. To the contrary, reverse rotation of the spool may be defined herein as the direction of rotation serving to accomplish playout or removal of the line from the spool such as when casting or when a fish strikes the lure attached to the end of the line.

Upon manual forward rotation of the crankshaft the drive mechanism will serve to automatically engage the spool causing its forward rotation and takeup of the fishing line. However, the drive mechanism of the subject invention is further structured to automatically disengage from its driving interconnection with the spool upon the spool being forced into a reverse direction of rotation, such as when casting, etc.

However, another important feature of the present invention is the existence of an anti-reversing assembly associated with the subject reel construction wherein the crankshaft and crankarm are prevented from free rotation when the spool is forced into reverse rotation. To the contrary, the crankarm and crankshaft are maintained in whatever set position originally assumed when the spool began its reverse rotation. This in turn prevents possible injury and certainly inconvenience to the user of the subject fishing reel assembly since the crankarm will not be set into free, rapid rotation upon the reverse rotation of the spool. The fingers or hand of the fisherman will therefore not be injured as is common with certain prior art reel constructions.

Other structural features of the present invention include bearing means serving to support and allow relative rotation of the spool relative to the coaxially disposed crankshaft. In addition, a drag setting means is particularly structured to adjustably regulate a biasing force tending to forceably engage a portion of the spool with a friction member which does not rotate with the spool. Accordingly, such frictional engagement between a friction member of the drag assembly and the spool itself impedes the reverse rotation of the spool therefore defining an adjustable drag being placed thereon which is easily regulatable by a drag setting member positioned on the same side of the reel frame and spool as the crankarm.

The invention accordingly comprises the features of construction, combination of elements and arrangment of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
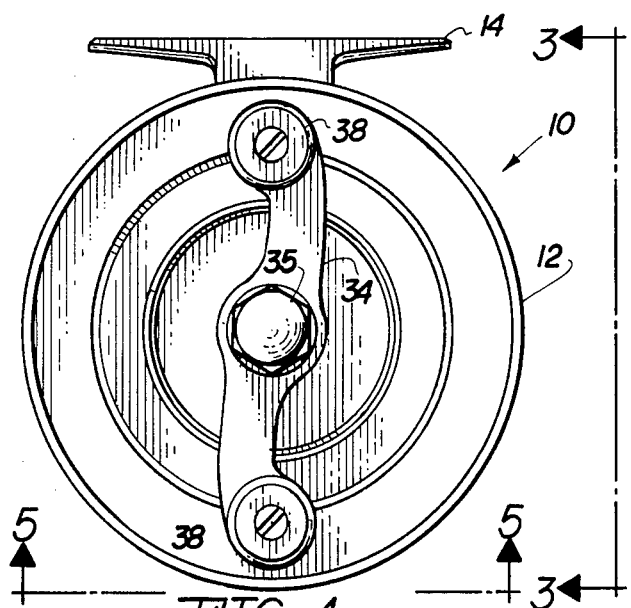
FIG. 1 is a side elevation view of the reel assembly of the present invention.
Figure 2:
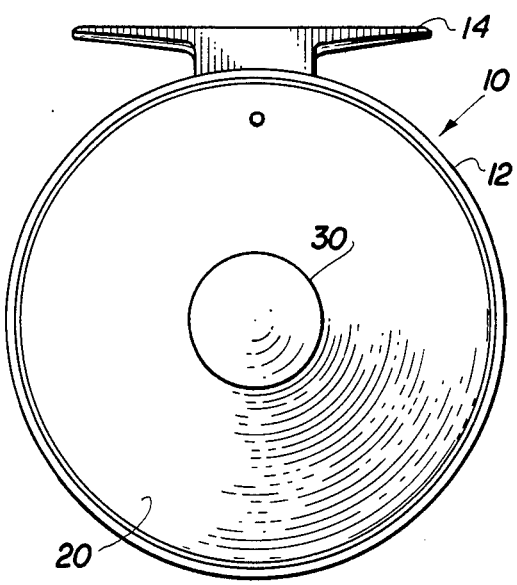
FIG. 2 is a rear elevation view of the embodiment of FIG. 1.
Figure 3:
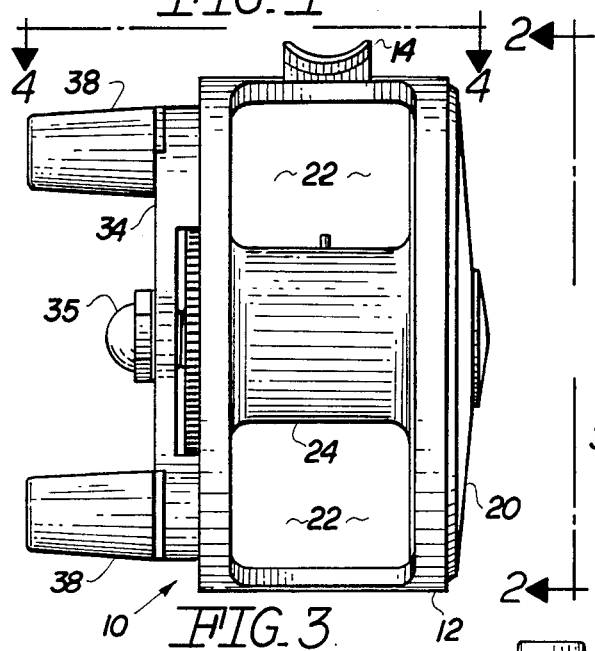
FIG. 3 is an end view along line 3—3 of FIG. 1.
Figure 4:
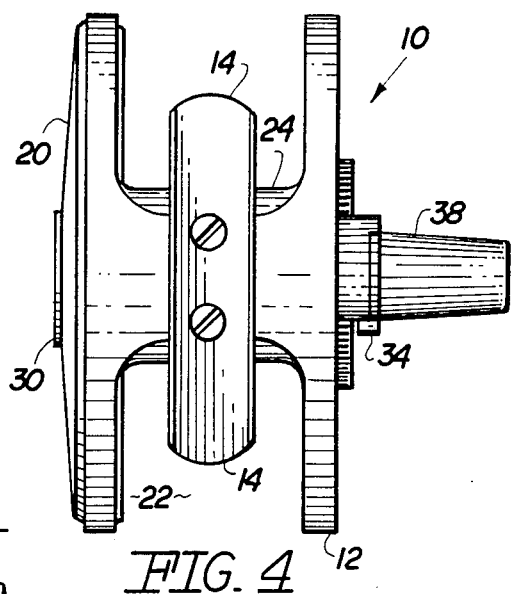
FIG. 4 is a top plan view along line 4—4 of FIG. 3.
Figure 5:
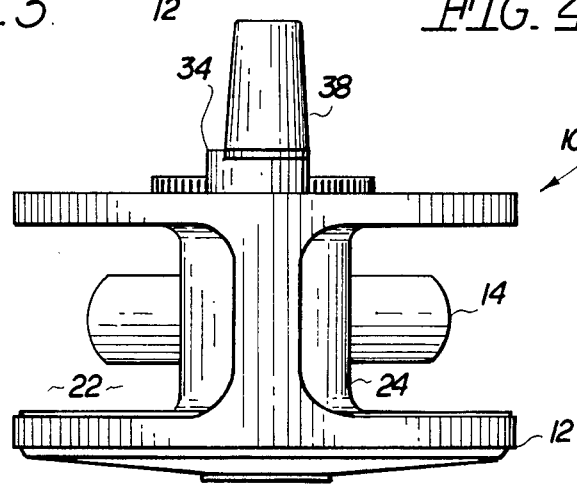
FIG. 5 is a bottom plan view along line 5—5 of FIG. 1.

As shown in the accompanying figures, the present invention relates to a reel assembly generally indicated as 10 including a reel frame 12 of rigid material construction. A connecting means 14 is secured to the reel frame as shown in FIGS. 1 through 6 and 9 and is of the type of substanliially conventional construction used to removably secure the reel assembly 10 to a fishing rod (not shown for purposes of clarity). A spool member 16 is mounted on what may be considered the interior of the frame 12 as at 18 and is adjacently positioned on the interior 18 of the spool 12 relative to end wall 20 of the reel 12. The spool 16 is designed to have opposed, spaced apart outwardly extending flanges to define a space 22 in which a fishing line is maintained in a continous rolled relation about itself as it is supported on a central hub 24 of spool 22.

Figure 6:
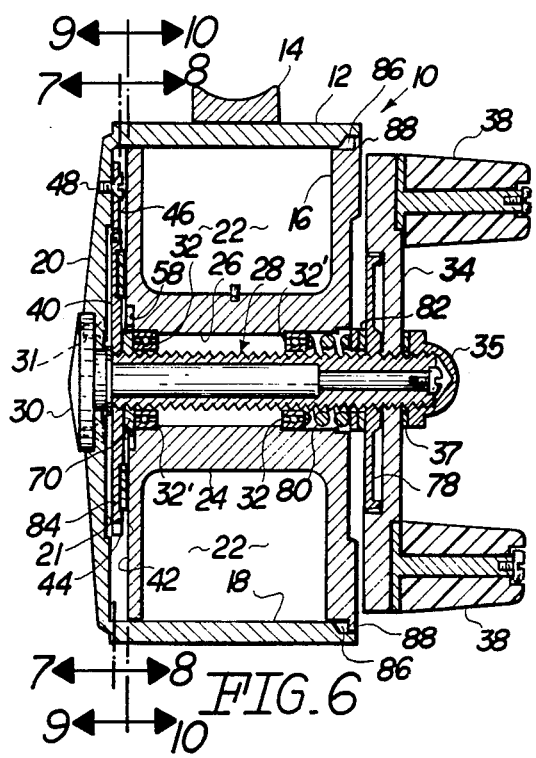
FIG. 6 is a sectional view showing interior structural details of the present invention.
Figure 7:
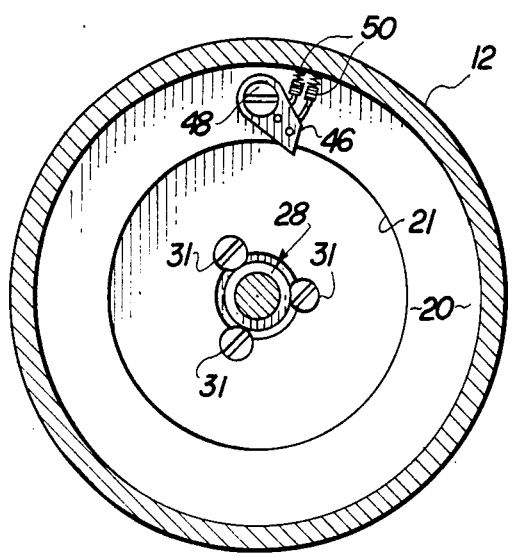
FIG. 7 is a sectional view along line 7—7 of FIG. 6.

The spool 16 has a central bore 26 extending coaxially through the spool as best shown in FIG. 6. A crankshaft assembly is generally indicated as 28 and is mounted to extend through the bore 26 and is connected to the reel frame 12 at least partially by enlarged head 30 secured to closed end 20. The crankshaft assembly 28 is rotatably mounted relative to the reel frame 12, end wall 20 and also the spool 16. Bearing means 32 are disposed on the interior of the bore and are mounted exteriorly of the crankshaft 28 so as to rotatably support the spool 16 and specifically hub 24 about the crankshaft assembly 28. Further, as will be explained in greater detail hereinafter, the bearing means 32 are engageable with a recess or stepped portion 32' and are movable relative to the crankshaft assembly 28, in turn causing at least minimal displacement of the spool 16 along the length of the crankshaft assembly 28.

A crankarm 34 is secured to the exterior of the crankshaft assembly 28 at an outer or free end thereof by means of the externally threaded surface of the exterior of the crankshaft assembly 28 and further held in place by a nut member 35 and associated washer element 37. Accordingly, rotation of the crankarm by gripping and rotating the rotatable knobs or handles 38 causes rotation of the crankshaft assembly 28 only in the aforementioned and defined forward rotational direction.

With reference primarily to FIGS. 6 through 9, the subject reel assembly 10 includes an anti-reversing assembly including a plate or disc element 40 secured to the crankshaft 28 as on the threaded outer surface as shown in FIG. 6 substantially adjacent the innermost end of crankshaft assembly 28 and also adjacent an inner face 42 of the spool 16. The disc element 40 is mounted in aligned registry with a slight recess portion 21 formed on the interior surface of the closed end 20 of the reel frame 12 (see FIGS. 6 and 7) and specifically has its outer periphery formed into a plurality of continuously formed teeth 44 configured and disposed in cooperative relation to a pawl member 46 pivotally secured to the interior surface of the closed end 20 of reel frame 12 by a connector member 48 and biased into engaging relation with the teeth 44 as clearly shown in FIGS. 6, 7 and 9. The biasing structure 50 may be secured to the reel frame 12 and positioned so as to force pawl 46 into abutting engagement with a leading portion 44' of anyone of the teeth 44 so as to stop and insure that reverse rotation as indicated by directional arrow 51 will not occur. It should be further emphasized that the biasing means 50 associated with pawl 46 and the position and shape of pawl 46 allows for forward direction of the plate member 40 as indicated by directional arrow 53. It should be readily apparent therefore that forward rotation of the crankshaft assembly 28 by manual rotation of the crankarm 34 provides forward rotation also of the plate element 40 based on the cooperative configuration of the plurality of teeth 44 and the pawl member 46 in accordance with directional arrow 53. However, the position and relative configuration of the teeth 44 and pawl member 46 and its biasing engagement relative to the teeth 44 prevent rotation of the plate element 40, crankshaft assembly 28 and crankarm 34 in a reverse direction of rotation.

Figure 9:
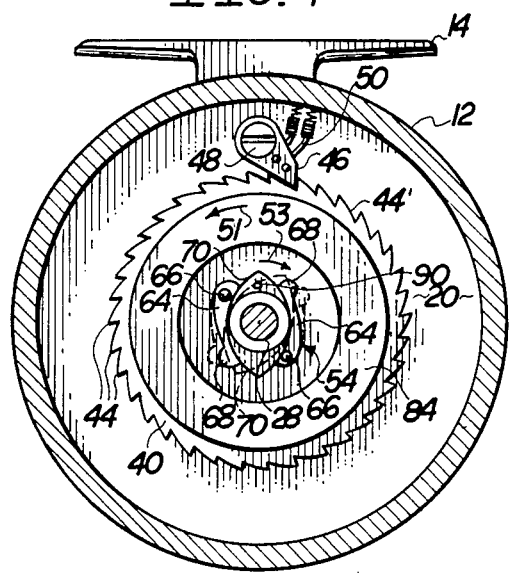
FIG. 9 is a sectional view along line 9—9 of FIG. 6.
Figure 10:
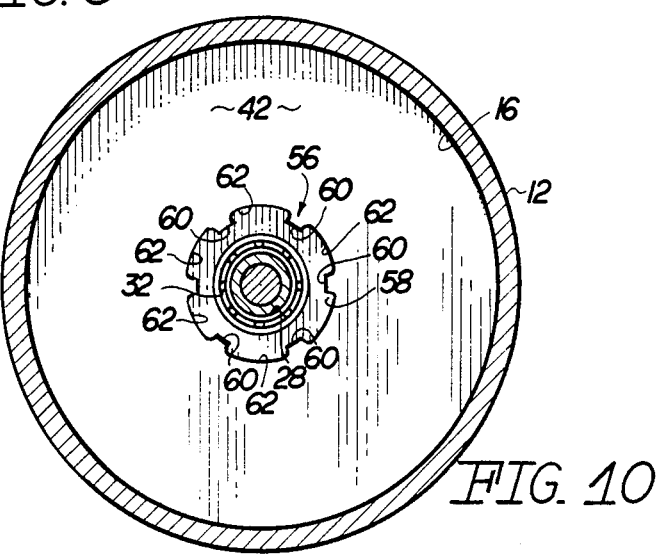
FIG. 10 is a sectional view along line 10—10 of FIG. 6.

Another important feature of the present invention is the incorporation of a direct drive mechanism including a drive arm assembly generally indicated as 54 mounted on plate 40 and a cooperatively positioned and structured lug assembly generally indicated as 56 integrally formed on the inner face 42 of the spool 16 as best shown in FIGS. 6, 9, 10 and 11. First with regard to FIG. 10, an integrally formed cutout portion 58 is defined in the innerface 42 of the reel 16. The periphery of this cutout portion is at least partially defined by a plurality of lugs 60 disposed in spaced relation to one another about the outer periphery 62 of the cutout portion 58 and extending radially inwardly from the outer periphery 62 as best shown in FIG. 10. The drive arm assembly 54 comprising the remainder of the direct drive mechanism comprises a plurality of drive arms 64 pivotally connected at one end as at 66 to the plate 40 such that the opposite end of the arms 64 as at 68 may be forced outwardly into engagement with anyone of a plurality of lugs 60 integrally formed on the inner face 42 of the reel 16. The outward travel of the drive arm 64 is accomplished by a forward rotational direction of the crankshaft assembly 28 causing a cam element 70 to rotate into the position generally represented in phantom lines as 70'. As shown in FIG. 6, the cam element 70 and accordingly the drive arms 64 are located at least partially within the recess 58 such that the outward expansion or travel of the drive arms will cause direct driving, abutting engagement with a corresponding number of lugs and in turn, due to the forward rotation of the crankshaft 28 and disc element 40, the spool will be directly driven by the driving, abutting engagement of the drive arm 64 with the respective lugs 60 which are engaged by the drive arms.

Figure 11:
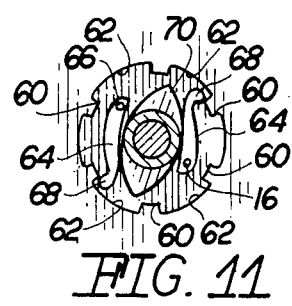
FIG. 11 is a detail view of a direct drive structure of the present invention.

Another structural feature of the present invention as best shown in FIG. 11, is the inability of the drive arm 64 to extend outwardly beyond their point of engagement with the lug 60 so that they will not come into direct abutting engagement with the outer periphery portion 62. Therefore, there is no frictional or wedging action between the outer ends 68 of drive arms 64 and the outer peripheral portion 62 of the cutout portion 58, and thus jamming is prevented. Upon the stopping of forward rotation of the crankshaft 28, disc element 40 and drive assembly 54, the drive arms 64 will assume their inoperated or retracted position as shown in solid lines in FIG. 9 and out of engagement with the respective lugs 60 formed on the inner surface 42 of the spool 16. Therefore, the direct driving engagement between the direct drive mechanism or the drive arms 64 will be automatically disconnected and the spool 16 will be allowed to rotate relative to the crankshaft 28 and frame 12 in a reverse rotational direction so as to allow the fishing line thereon to playout. Such reverse rotation will occur while the crankshaft 28, disc element 40 and crankarm 34 remain stabilized. Direct driving engagement between the crankshaft 28, through the aforementioned direct drive means will be accomplished and re-established upon manual forward rotation of the crankarm 34, crankshaft assembly 28, disc element 40 and the immediate engagement of the drive arms 64 with the plurality of lugs 60.

Figure 8:
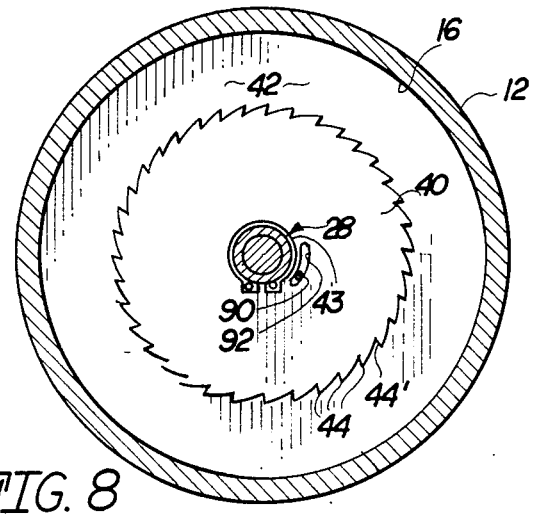
FIG. 8 is a sectional view along line 8—8 of FIG. 6.

Also, with regard to FIGS. 8, 9 and 11, the rotation of the cam member 70 is limited due to the existence of a cam pin 90 secured to the cam 70 as shown in FIG. 9 and more specifically passing through an elongated curvilinear slot 92 integrally formed in the disc element 40. It should be apparent therefor that the rotation of the cam element 70 forcing the outward positioning or travel of the arm 64 such that their ends 68 engage correspondingly positioned lugs 60 is specifically limited so that the ends 68 of the arm 64 cannot come into direct and potentially jamming frictional engagement with the outer periphery 62 as shown in FIGS. 10 and 11. This outward movement of the arm 64 is limited by the limited displacement or rotation of cam element 70 in turn caused by the cam pin 90 only being allowed to travel between the ends of the curvilinear elongated slot 92 formed in disc element 40.

Another feature of the present invention is the existence of a drag setting assembly including a drag setting element 78 mounted on the crankshaft assembly 28 or more specifically, the threaded outer surface thereof immediately adjacent to the crankarm 34 and in a readiy accessible position relative to the hand of the fisherman which is used to manually rotate the crankarm 34.

A biasing means 80 preferably in the form of a coil spring or like element is disposed between the drag setting element 78 and the correspondingly positioned bearing means 32. Washer structures or appropriate elements as at 82 may be positioned in between the biasing spring 80 and the drag setting plate 78. Accordingly, the advancement of the drag setting member 78 towards the innermost end of the shaft assembly 28 will cause additional biasing force to be placed on the correspondingly positioned bearing means 32. This additional biasing force will cause the spool member 16 to shift or be displaced axially along the length of the crankshaft assembly 28 such that frictional member or structure 84, preferably having an annular configuration, is engaged by the inner surface 42 of the spool 16 thereby impeding the reverse rotation of the spool 16 causing drag to be exerted thereon. The frictional member 84 is of course fixedly secured to the inner surface of the plate element 40 as best shown in FIG. 9. An annular recess as at 86 may be integrally formed in the outer peripheral portions of the reel frame 12 as shown in FIG. 6 to allow for the inward displacement of the spool 16 or more particularly the outer rim thereof as at 88 in order for the inner face 42 of the spool 16 to be forced into abutting, frictional engagement with the frictional member 84.

Reverse rotation of the drag setting member 78 towards the free end of the crankshaft assembly 28 of course reduces the biasing force exerted on the spool by the biasing spring 80 and reduces the amount of drag placed on the spool 16.

Now that the invention has been described,

What is claimed is:

1. A fishing reel assembly having a direct drive and automatic anti-reversing capabilities, said assembly comprising:
   (a) a reel frame including mounting means for securing said reel frame to a fishing rod,
   (b) a spool including an inner face and a centrally disposed bore extending therethrough and structured to contain fishing line thereon,
   (c) a crankshaft having an innermost and an outermost end, said crankshaft positionable through said bore in coaxial relation to said spool and rotatably connected to said reel frame at said innermost end thereof, said spool rotatably supported on said crankshaft,
   (d) a crank arm secured to said outermost end of said crankshaft in adjacent and spaced relation to said reel frame and rotatable with said crankshaft relative to said reel frame,
   (e) automatic anti-reversing means, including a disc element secured to said crankshaft, for preventing reverse rotation of said crankshaft and comprising a first structure secured to said reel frame and a second structure comprising a plurality of teeth formed on the periphery of said disc element for rotation therewith, said first and second structures cooperatively disposed and constructed for instant abutting engagement with one another upon reverse rotation of said spool,
   (f) direct drive means for accomplishing forward rotation of said spool upon forward rotation of said crankshaft by said crankarm,
   (g) said direct drive means comprising a plurality of lugs fixedly formed on said spool and a plurality of drive arms pivotally mounted a substantially one end thereof so as to rotate with said crankshaft, an opposite end of each drive arm configured and pivotally disposable into abutting, direct driving engagement with said plurality of lugs, (h) said plurality of drive arms disposable between an operative position, during forward rotation of said crankshaft and an inoperative position during reverse rotation of said crankshaft, said operative position defined by direct driving engagement of said plurality of drive arms with a corresponding number of said plurality of lugs and said inoperative position defined by disengagement of said plurality of drive arms from said plurality of lugs.

(i) said direct drive means further comprising a cam member secured to said crankshaft structure so as to rotate therewith, said cam member disposed in adjacent and engageable relation to said plurality of drive arms and configured for concurrent movable engagement with said plurality of drive arms between said operative position and said inoperative position, (j) said pluralilty of lugs formed on said inner face of said spool in surrounding relation along the periphery of a recessed cutout portion on said inner face, said plurality of lugs disposed in spaced relation to one another and extending radially inward therefrom towards said plurality of drive arms, (k) said plurality of drive arms disposed at least partially within said cutout portion and in surrounded relation by said plurality of lugs, said lugs spaced sufficiently close to allow immediate driving engagement of said drive arms with said respective lugs, said spool being forced into forward rotation by said direct drive meansupon forward rotation of said crankshaft and said drive means being instantly disengaged from said lugs upon reverse rotation of said crankshaft, (1) said spool rotating freely within said reel frame upon said drive arms being instantly disengaged from said lugs wherein said drive means is in said inoperative position, and (m) said plurality of drive arms pivotally mounted in abutting, driving engagement with said cam member for limited outward disposition into abutting engagement with said plurality of lugs and out of engagement with said periphery of said cutout portion, whereby jamming engagement between said spool and said plurality of drive arms is prevented.

2. An assembly as in claim 1 further comprising drag means for placing drag on said spool and impeding reverse rotation thereof, said drag means comprising a drag setting member secured to said crankshaft structure and selectively positionable along a portion of the length thereof, a friction memmber secured to said disc element immediately adjacent said inner face of said spool and biasing means interconnecting between said drag setting member and said spool for exerting an adjustable biasing force on said inner face of said spool, said spool selectively positionable axially along said crankshaft structure whereby said inner face is forced into frictional engagement with said friction member.

3. An assembly as in claim 2 wherein said friction member is fixedly mounted on a correspondingly positioned surface of said disc element relative to said inner face and said disc element being fixedly positioned relative to said spool upon reverse rotation of said spool through abutting engagement between said first and second structures of said anti-reversing means.

4. An assembly as in claim 1 further comprising bearing means disposed within said central bore of said spool in interconnecting relation between said spool and said crankshaft structure for rotation of said spool relative to said crankshaft structure.

5. An assembly as in claim 1, wherein said cam member comprises a cam pin secured to said cam member and passing through an elongated curvlinear slot integrally formed in said disc element, whereby rotation of said cam member is limited.

* * * * *